(12) United States Patent
Huggar et al.

(10) Patent No.: US 11,525,755 B1
(45) Date of Patent: Dec. 13, 2022

(54) FLUID STORAGE WATER MONITOR

(71) Applicant: United Services Automobile Association (USAA), San Antonio, TX (US)

(72) Inventors: Stacy Callaway Huggar, San Antonio, TX (US); Emily Kathleen Krebs, San Antonio, TX (US); Jeffrey Neal Pollack, San Antonio, TX (US); Carlos J P Chavez, San Antonio, TX (US); Stefanie Jean Acosta, San Antonio, TX (US); Janelle Denice Dziuk, Falls City, TX (US); Mitzi Ruiz, San Antonio, TX (US); Michael Joseph Gaeta, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 339 days.

(21) Appl. No.: 16/800,891

(22) Filed: Feb. 25, 2020

Related U.S. Application Data

(60) Provisional application No. 62/811,379, filed on Feb. 27, 2019.

(51) Int. Cl.
*G08B 21/20* (2006.01)
*G01M 3/40* (2006.01)
*G01F 23/80* (2022.01)

(52) U.S. Cl.
CPC ............. *G01M 3/40* (2013.01); *G01F 23/802* (2022.01); *G08B 21/20* (2013.01)

(58) Field of Classification Search
CPC .......... G01M 3/40; G01M 3/04; G01M 3/045; G01F 23/802; G01F 23/00; G01F 23/80; G08B 21/20
See application file for complete search history.

(56) References Cited

U.S. PATENT DOCUMENTS

| 10,119,884 | B1 | 11/2018 | Billman et al. |
| 10,121,353 | B1* | 11/2018 | Billman ................. G08B 25/10 |
| 10,163,326 | B1 | 12/2018 | Billman et al. |
| D847,680 | S | 5/2019 | Billman et al. |
| D847,681 | S | 5/2019 | Flachsbart et al. |
| 10,466,137 | B1 | 11/2019 | Billman et al. |
| 10,510,238 | B1 | 12/2019 | Billman et al. |
| 10,526,771 | B1 | 1/2020 | Devereaux et al. |

(Continued)

FOREIGN PATENT DOCUMENTS

JP 2007248462 A * 9/2007 ............. G01F 22/00

OTHER PUBLICATIONS

US 10,309,860 B1, 06/2019, Billman et al. (withdrawn)
U.S. Appl. No. 15/636,317, filed Jun. 28, 2017, Bradly Jay Billman.

*Primary Examiner* — Tarun Sinha
*Assistant Examiner* — James I Burris
(74) *Attorney, Agent, or Firm* — Fletcher Yoder, P.C.

(57) ABSTRACT

A water detection system for a fluid storage system includes a housing configured to be disposed in fluid communication with a fluid storage vessel, a water-activated battery disposed within the housing and configured to produce an electrical voltage upon contact with water, and an electronic circuit disposed within the housing and configured to detect water above a threshold within the fluid storage vessel based at least in part on the electrical voltage.

20 Claims, 3 Drawing Sheets

(56) References Cited

U.S. PATENT DOCUMENTS

| | | | |
|---|---|---|---|
| 10,564,065 B1 | 2/2020 | Billman et al. | |
| 2004/0117135 A1* | 6/2004 | Rogers | B67D 7/348 |
| | | | 702/156 |
| 2009/0048728 A1* | 2/2009 | Nunn | F02M 37/28 |
| | | | 701/31.4 |
| 2012/0097030 A1* | 4/2012 | Haas | F02M 37/30 |
| | | | 96/112 |

* cited by examiner

FLUID STORAGE WATER MONITOR

CROSS-REFERENCE TO RELATED APPLICATION

This application claims benefit of U.S. Provisional Application Ser. No. 62/811,379, entitled "FLUID STORAGE WATER MONITOR," filed Feb. 27, 2019, which is hereby incorporated by reference in its entirety for all purposes.

BACKGROUND

The present disclosure relates generally to detecting the presence of water in a fluid storage tank. More specifically, the present disclosure relates to detecting the presence of water in fluid storage vessels using water-activated batteries.

While water is generally recognized as being a beneficial part of everyday life, in certain circumstances water can have certain undesirable effects. For example, water contamination in vehicle fuel can cause engine damage. Water contamination in organic solvents, for example, can cause certain inefficiencies in chemical processes. Indeed, if water is present in sufficient amounts, it can cause side reactions to take place in certain controlled processes which can be detrimental to operations that rely on such processes. Thus, there is a need to detect and in some instances, mitigate the presence of water in fluid containment vessels.

SUMMARY

In one embodiment, a water detection system for a fluid storage system includes a housing disposed in fluid communication with a fluid storage vessel that allows water transmission into the housing. The water detection system also includes a water-activated battery disposed within the housing that produces electrical voltage upon contact with water. The water detection system further includes an electronic circuit that detects water above a threshold within the fluid storage vessel based at least in part on the electrical voltage. The electronic circuit is separated from the water-activated battery by a compartment of the housing.

In one embodiment, a fluid storage system includes a chemical drying agent stored in a chamber, and a water detection device having a water-activated battery that outputs an electrical power upon contact with water. The fluid storage system also includes an actuator coupled to the water detection device that releases the chemical drying agent from the chamber into the water in response to receiving the electrical power.

In one embodiment, a water detection device includes a housing and a water-activated battery disposed in the housing. The water-activated battery supplies electrical power to an electronic circuit in response to water contacting the water-activated battery. The water detection device also includes a sealed chamber of the housing storing the electronic circuit. The electronic circuit communicates an alert indicative of water detection to one or more electronic devices via a communication network.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
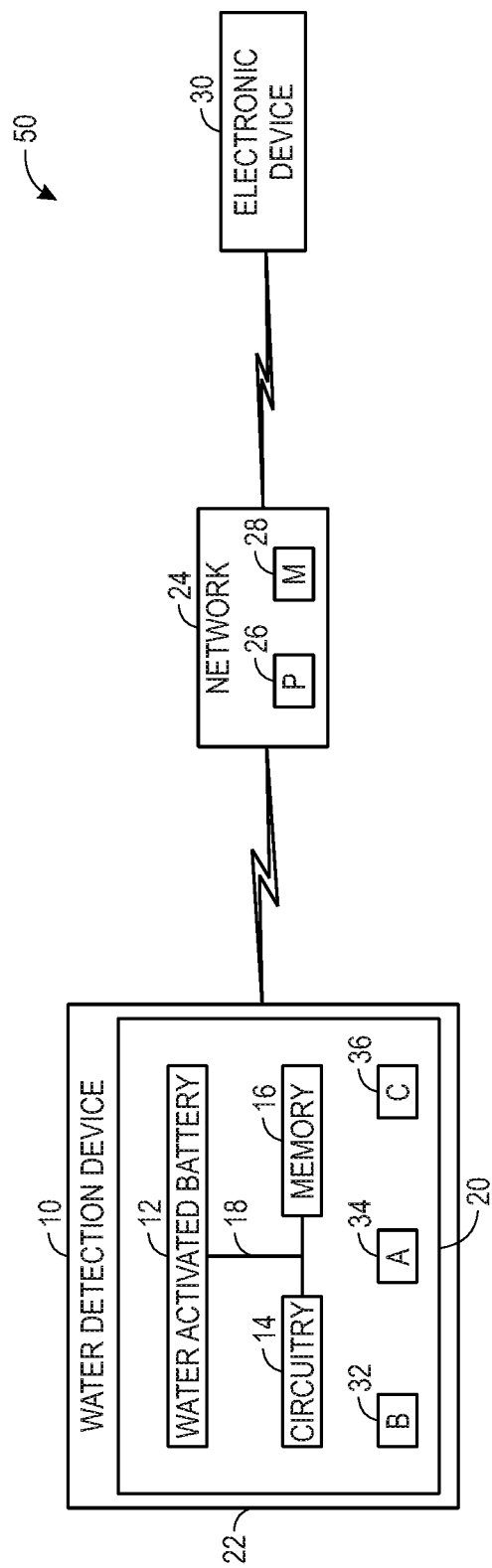
FIG. 1 is a schematic of a water detection system that includes a water detection device, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward the use of water-activated battery technology to detect water present in reservoirs that store other fluids, such as fuel. Example embodiments include systems and methods that use water battery actuation to detect water inside of a fuel (e.g., gasoline) tank at a gas station (or inside of a car) and alert when water is detected. Certain systems and methods of this disclosure may use actuators that may ameliorate or eliminate the detected water. For example, water-initiated battery activation may allow an actuator to be energized, which may cause a chemical pack (e.g., a pack containing a desiccant) to open to absorb the water.

By way of example, a water detection device (e.g., a water detection assembly) may be utilized to monitor the presence of accumulated water in certain locations designed to store a non-aqueous fluid (e.g., organic solvent storage facilities, fuel storage facilities). In certain embodiments, the water detection device may include a water-activated battery that generates electrical power (e.g., at a certain voltage for a certain current) upon exposure to water. The water detection device may thus be in a dormant condition (e.g., no signals are sent or received) until water is present in a sufficient amount to activate the battery.

The housing of the water detection device may include physical features (e.g., fluid passageways) that may direct water toward the water-activated battery, such as capillaries and/or channels that enable water to flow along a target path into the housing and toward the battery. Further, the housing may be attached to one or more channels that are configured to contact the stored fluid for sampling purposes. The water may move through the channels due to capillary action, allowing for sampling of a sufficient amount of water for activation of the battery when the concentration of the water is above a threshold. Because the water will generally have a higher surface tension than the stored fluid, the water may more readily move through the channels.

The water detection device may be configured to communicate with one or more external electronic devices (e.g., a server, the Internet, a computer, a mobile phone, a tablet, and so forth) when the battery is activated. For example, upon exposure to water, the battery may be activated and thus supply electronic power to a communication beacon, which may then communicate with one or more external electronic devices to, for example, notify a user that a certain amount of water has been detected within a storage unit. In certain embodiments, the communication beacon may be in communication with one or more electronic devices via software on the electronic devices that may be utilized with the water detection device. For instance, the software may be an application on an electronic device (e.g., mobile phone, tablet, computer, or another suitable electronic device) that may be linked (e.g., paired and/or coupled) to the water detection device. The software may enable the user to monitor and manage multiple water detection devices that may be positioned in various fluid storage locations. In any case, the software may alert the user of a detection event when a respective water detection device is activated upon exposure to water.

Turning now to the drawings, FIG. 1 is a schematic of a water detection system 50 that includes a water detection device 10 (e.g., a water detection assembly) that includes a water-activated battery 12, an electronic circuit 14 (e.g., a processor and/or other circuitry), and memory 16, in accordance with embodiments described herein. The water-activated battery 12, the electronic circuit 14, and/or the memory 16 may be electronically connected together using a coupling 18, such as a solder, a wire, a bus, or another suitable technique. Additionally, the water-activated battery 12, electronic circuit 14, and/or the memory 16 may be physically coupled to one another by a connector 20 (e.g., a circuit board). In certain embodiments, the water-activated battery 12, the electronic circuit 14, and/or the memory 16 may be disposed in a common housing 22. However, each component may also have its own housing, which may be generally represented by element 22. Furthermore, the water-activated battery 12, the electronic circuit 14, and/or the memory 16 may be modular in design, such that the water-activated battery 12, the electronic circuit 14, and/or the memory 16 may be connected, disconnected, and reconnected to one another as desired (e.g., via the housing 22). The water detection device 10 may also be within communication range of an electronic network 24 (e.g., a server, the Internet, and so forth). The electronic network 24 may include a processor 26 and memory 28 that may be configured to store instructions that the processor 26 executes. In certain embodiments, the water detection device 10 may be configured to communicate with one or more electronic devices 30 (e.g., a computer, a tablet, a mobile phone, or another suitable electronic device) via the electronic network 24, and thus, send and receive information to and from such electronic devices 30. Features of the water detection device 10 are described in further detail in U.S. Pat. No. 10,121,353, which issued on Nov. 6, 2018 to Billman et al., the entire contents of which are incorporated by reference herein in its entirety.

In certain embodiments, before exposure to water, the water-activated battery 12 may be in a dormant condition, such that no signal is transferred to or received from the network 24 by the water detection device 10. However, when the water detection device 10 is exposed to water, Upon exposure to water, the water detection device 10 may be activated by the water to an active condition, such that the water detection device 10 transmits a signal to the network 24 (e.g., via the electronic circuit 14), and ultimately to an electronic device 30. In certain embodiments, the water detection device 10 may communicate directly with the electronic device 30 (e.g., via a Bluetooth feature of the water detection device 10).

The water-activated battery 12 may be capable of remaining dormant for a significant period of time before generating an electrical voltage of the electrical power supplied to the electronic circuit 14 and/or the memory 16. As discussed above, the water-activated battery 12 may remain dormant (e.g., incapable of generating a voltage) until exposed to water, when the water-activated battery 12 may then generate the electrical voltage to power the electronic circuit 14 and/or the memory 16. For example, in certain embodiments, the water-activated battery 12 may include a dry material that initiates a chemical reaction when exposed to water. The chemical reaction may then generate the electrical voltage, which may be supplied to the electronic circuit 14 and/or the memory 16 via the bus 18. Suitable dry materials for an anode of the water-activated battery 12 include, but are not limited to, magnesium (e.g., magnesium AZ61A, magnesium AZ31B, magnesium AP65 and magnesium MTA75), aluminum, zinc, lead, thallium, manganese, silicon, iron, calcium, nickel, copper, and/or a combination thereof.

Furthermore, the water-activated battery 12 may include a cathode and an anode, which may facilitate the chemical reaction. In certain embodiments, the cathode may include a depolarizer (e.g., sulfur, additive, binder, wax, a combination thereof, or other suitable materials) and a current collector (e.g., silver chloride, cuprous iodide, cuprous thiocyanate, lead chloride, cuprous chloride, or combinations thereof). The water-activated battery 12 may also include separators (e.g., nonconductive spacers) placed between the anode and the cathode to form a space for free ingress of electrolytes and egress of corrosion products. Each of these features is represented by the water-activated battery 12. Separators may be in the form of disks, rods, glass beads, and woven fabrics. Dunk-type batteries may utilize a nonwoven, absorbent, nonconductive material to both separate the electrodes and absorb the electrolyte. Furthermore, in certain embodiments, the water-activated battery 12 may include a wicking material between one or more of the anode, the cathode, and/or the separators. The wicking material may enhance the ability of the water-activated battery 12 to activate upon exposure of water by directing the water to areas of the water-activated battery 12 that trigger the chemical reaction, such that the electrical voltage may be generated and supplied to the electronic circuit 14 and/or the memory 16.

In certain embodiments, the water-activated battery 12 may include one or more cells that each include the cathode, the anode, and/or the separators. For example, in certain embodiments, the water-activated battery 12 may include four cells that are spaced apart from one another at a predetermined distance. In other embodiments, the water-activated battery 12 may include less than four cells (e.g., three, two, or one cell) or more than four cells (e.g., five, six, seven, eight, nine, ten, or more cells). Furthermore, in some cases, an efficiency of the water-activated battery 12 may be based on the spacing between the cells. For example, cells of the water-activated battery 12 may release heat and/or chemicals that may affect the operation of other cells in the water-activated battery 12. Accordingly, spacing the cells at a distance that reduces an amount of heat transferred between cells, but also reduces a size of the water-activated battery 12 may be predetermined to maximize an efficiency of the water-activated battery 12. In certain embodiments, the cells of the water-activated battery 12 may include various materials, which may also effect an efficiency of the water-activated battery 12. For example, the cells of the water-activated battery 12 may include magnesium oxide, carbon acetate, copper, and/or another suitable material that may be configured to generate an electrical voltage upon exposure to water. In some cases, water may trigger a chemical reaction in the cells of the water-activated battery 12, which may cause a switch of the water-activated battery 12 to close, thereby enabling electrical power to flow to an outlet (e.g., a portion electrically coupled to the electronic circuit 14 and/or the memory 16) of the water-activated battery 12. In certain embodiments, the water-activated battery 12 may be activated when exposed to between 0.1 milliliters (mL) and 5 mL of water, between 0.5 mL and 3 mL of water, between 1 mL and 2 mL of water, or approximately (e.g., within 5% of or within 10% of) 1.5 mL of water.

In certain embodiments, the water detection device 10 may include an auxiliary battery 32 that may be separate from the water-activated battery 12. The auxiliary battery 32 may not be water-activated, and may be continuously in an active condition (e.g., configured to provide an electrical voltage). The auxiliary battery 32 may then be used to power the electronic circuit 14 and/or the memory 16 by supplying the electrical voltage to the electronic circuit 14 and/or the memory 16. In certain embodiments, the auxiliary battery 32 may allow the electronic circuit 14 to provide intermittent signals to the electronic device 30. For example, the auxiliary battery 32 may periodically provide an electrical voltage to the electronic circuit 14, such that the electronic circuit 14 may perform a self-diagnosis and communicate with the electronic device 30 and/or the network 24. When the water-activated battery 12 activates (e.g., water contacts the water-activated battery 12), the electronic circuit 14 may then provide a continuous signal and/or communication with the electronic device 30 and/or the network 24. For example, the intermittent signals may become so frequent that the signal and/or communication seems continuous or the continuous signal may override/overlay the intermittent signals. In still further embodiments, the auxiliary battery 32 may be configured to receive electrical charge wirelessly through a radio frequency (RF) device (e.g., an interrogator device that emits an electrical field toward an indicator to detect a characteristic of a component). For example, the electronic circuit 14 may be associated with an RF tag that may provide the RF device with information associated with the electronic circuit 14 (e.g., a status of the electronic circuit, a condition of the electronic circuit, and/or a function in which the electronic circuit performs). Thus, when the RF device emits the electrical field, the auxiliary battery 32 may absorb electrical energy and charge itself.

Furthermore, in certain embodiments, the water detection device 10 may include or be associated with certain features configured to mitigate the presence of water when water is detected. For example, the water detection device 10 may include an actuator 34 and a chemical drying agent 36 (e.g., a source of a chemical drying agent). The chemical drying agent 36 may include, for example, one or more of silica gel, calcium chloride, calcium sulfate, zeolites, or activated charcoal, to name a few. In such embodiments, the electrical voltage generated by the water-activated battery 12 may be used to energize the actuator 34, which may open a container or chamber storing the chemical drying agent 36 (e.g., a desiccant) to release the chemical drying agent 36, or otherwise inject the chemical drying agent 36, into the fluid to decrease or remove the water. Once the water in the fluid is below a level at which the water-activated battery 12 no longer generates the electrical voltage (e.g., stops generating the electrical power), the actuator 34 may no longer be energized, which may cut off the chemical drying agent 36 from the fluid (e.g., by closing the container or chamber to block release of the chemical drying agent 36 or stop injecting the chemical drying agent 36 into the fluid).

While the water-activated battery 12, the actuator 34, and/or the chemical drying agent 36 may be exposed to water upon a water detection event, the electronic circuit 14 and/or the memory 16 may be included in a separate compartment or housing (e.g., within the housing 22) that seals such components from the water and/or other substances (e.g., a sealed chamber of the housing 22). As such, when the water enters the housing 22 of the water detection device 10, the water-activated battery 12 may generate the electrical voltage that supplies power to the electronic circuit 14 and/or the memory 16, but the water may be blocked from contacting the electronic circuit 14 and/or the memory 16. Therefore, the electronic circuit 14 and/or the memory 16 may be utilized for multiple water detection events without degrading and/or otherwise incurring damage. However, in certain embodiments, the water-activated battery 12 may be replaced upon each water detection event. As discussed above, the water-activated battery 12 may be modular with respect to a housing of the water detection device 10 to facilitate replacement of the water-activated battery 12 with a new water-activated battery 12 that may be dormant until exposed to water.

While a single water detection device 10 is shown in FIG. 1, it should be noted that more than one of the water detection devices 10 may be used together within a single fluid storage vessel or multiple fluid storage vessels. In such embodiments multiple of the water detection devices 10 may be connected to the same electronic network 24 and/or electronic device 30. A location of each of the water detection devices 10 may be recorded to correspond to a device number of a corresponding water detection device 10. For instance, a water detection device 10 may be associated with a vessel identifier which identifies a respective vessel, and thus, the water detection device 10 may be associated with the vessel. As another example, a water detection device 10 may be associated with a location within a vessel (e.g., a top, bottom, or sidewall of the vessel). Such information may be recorded in a table for presentation via a graphical user interface (GUI) of a software program and/or another suitable location (e.g., memory associated with the electronic network 24 and/or the memory 16). To further assist a user to determine a location of one of the water detection devices 10, the location of the water detection devices 10 may be displayed in a GUI with reference to a plan, map, or schematic representation of the particular system in which the water detection devices 10 are deployed.

As discussed above, the electronic device 30 may communicate with the water detection device 10. In certain embodiments, the electronic device 30 may include software that may be utilized directly with the water detection device 10. For example, the electronic device 30 may include an application or computer program that may be configured to recognize and/or interact with the water detection device 10.

In certain embodiments, the electronic circuit 14 of the water detection device 10 may be capable of transmitting a wireless electronic signal for communication with the electronic network 24 using one or more of a variety of wireless communication techniques. For example, the electronic circuit 14 may be configured to wirelessly communicate with the electronic network 24 using Wi-Fi, near field communication, Bluetooth, Zigbee, Z-wave, ISM, an embedded wireless module, or another suitable wireless communication network. Furthermore, the electronic circuit 14 may be programmed to send a message to an address via the electronic network, such as an IP address, URL, email address, telephone number, a dedicated monitoring station, or other type of electronic address known to those of skill in the art, and any combination of the same. Further still, in certain embodiments, the electronic network 24 may be connected to a vehicle communications bus (e.g., a controller area network (CAN) bus), for instance, to a vehicle control system, to allow for the water detection device 10 to provide detection events directly to a vehicle in which a fuel tank having the water detection device 10 is located. In such embodiments, the vehicle may provide an alert to a vehicle occupant that the fuel tank has water.

Figure 2:
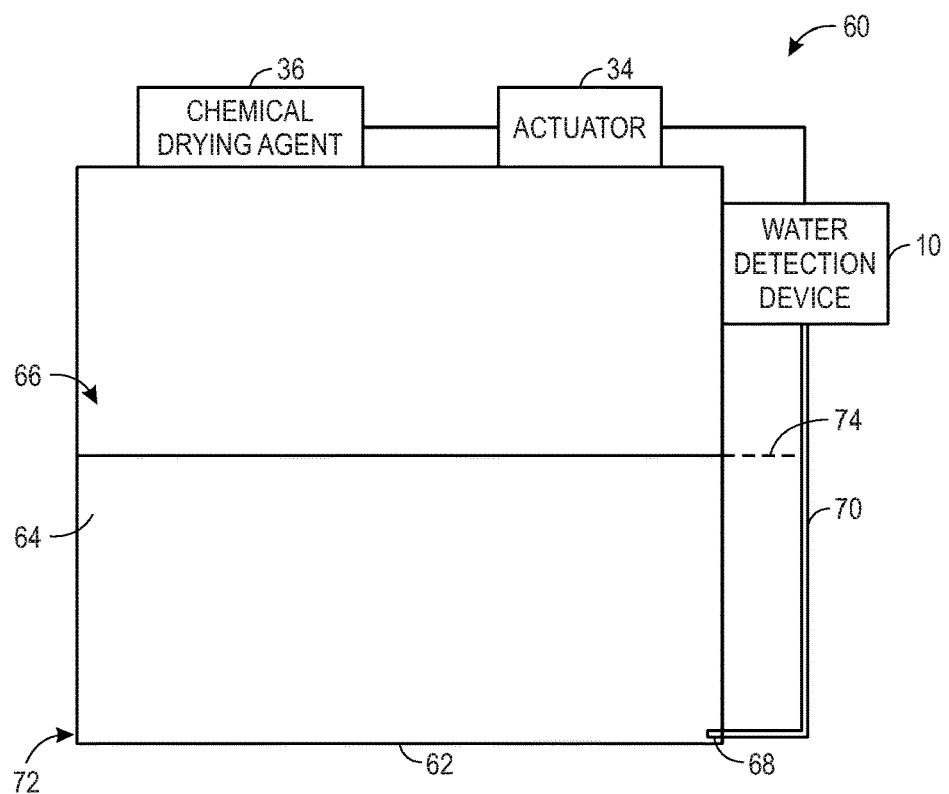
FIG. 2 is a schematic of an embodiment of a water storage system using the water detection system of FIG. 1, in accordance with embodiments described herein.

FIG. 2 is a block diagram of a fluid storage system 60 that may include one or more water detection devices 10, in accordance with embodiments described herein. In the illustrated embodiment, the fluid storage system 60 includes a fluid storage vessel 62 configured to hold a fluid 64, such as a fuel (e.g., gasoline, diesel, an organic liquid). The fluid storage vessel 62 may include one or more features that allow for the introduction of the fluid 64 into and out of the fluid storage vessel 62, such as inlet and outlet ports, and so forth. The fluid storage vessel 62 may also incorporate other features for the maintenance of fluid pressure or other fluid parameters (e.g., fluid temperature) within the fluid storage vessel 62.

In the illustrated embodiment, the water detection device 10 is positioned externally relative to the fluid storage vessel 62, and is fluidly coupled to an interior 66 of the fluid storage vessel 62 to allow for water within the fluid 64 to move toward the water detection device 10. In particular, the illustrated fluid storage vessel 62 includes an outlet port 68 that is coupled to a fluid channel 70. The fluid channel 70 is in turn coupled to the water detection device 10, and enables water within the fluid 64 to activate the water-activated battery 12 of the water detection device 10. In some embodiments, the water-activated battery 12 may be disposed within a chamber of the housing 22 of the water detection device 10, and the fluid channel 70 may be in fluid communication with an interior of the fluid storage vessel 62. In certain embodiments, the outlet port 68 may be positioned toward a bottom 72 of the fluid storage vessel 62 as shown. Additionally or alternatively, the outlet port 68 or other outlet ports may be positioned at other locations where the fluid 64 is able to be sampled.

The water detection device 10 is illustrated as being positioned at a vertical level that is above a maximum fill level 74 of the fluid storage vessel 62. Positioning the water detection device 10 in this manner allows pressure equilibration between the fluid channel 70 and the fluid storage vessel 62 such that the level of the fluid 64 within the fluid channel 70 is approximately the same as the level of the fluid 64 within the fluid storage vessel 62. Such a configuration may be desirable to allow any water that may be present within the fluid channel 70 to be drawn upward beyond the fluid level of the fluid storage vessel 62 through capillary action (or "wicking"). In certain embodiments, one or more agitation devices may be used in the fluid channel 70 to encourage migration of the water toward the water detection device 10.

As shown, the actuator 34 and the chemical drying agent 36 may also be positioned outside of the fluid storage vessel 62. However, the actuator 34, when energized upon activation of the water-activated battery 12 of the water detection device 10, may cause the chemical drying agent 36 to be released to the interior 66 of the fluid storage vessel 62 to remove at least a portion of the water present within the fluid 64.

Figure 3:
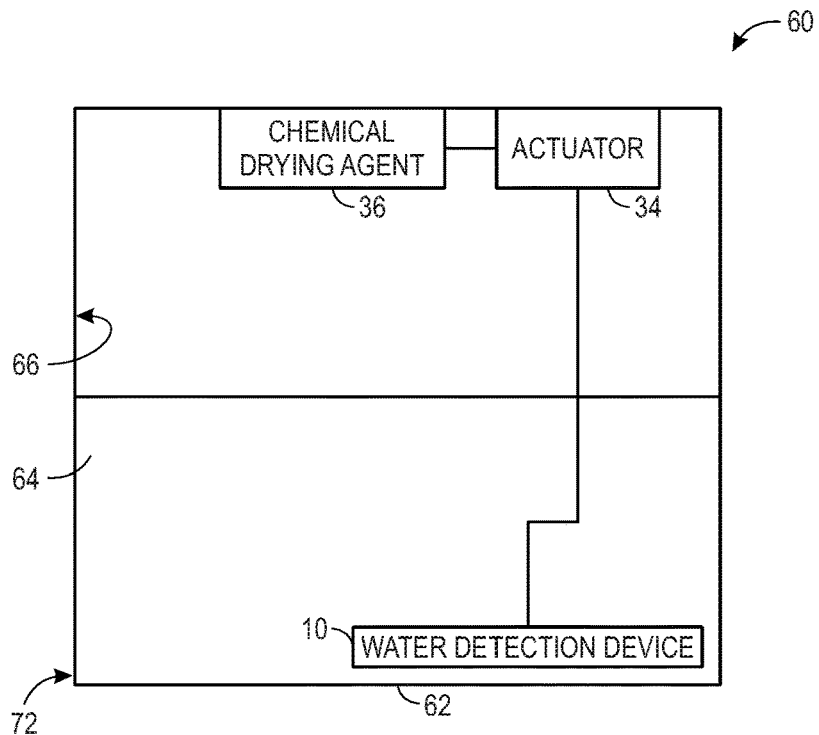
FIG. 3 is a schematic of another embodiment of a water storage system using the water detection system of FIG. 1, in accordance with embodiments described herein.

The configuration shown in FIG. 2 may be used for certain circumstances, such as when it may be desirable to isolate the water detection device 10 (e.g., the water-activated battery 12) from the bulk fluid stored within the fluid storage vessel 62. However, as illustrated in FIG. 3, in certain embodiments the water detection device 10 may be disposed within the fluid storage vessel 62, such as at the bottom 72 of the fluid storage vessel 62. Positioning the water detection device 10 in this location (and also positioning the fluid channel 70 at this location in the configuration of FIG. 2) may be desirable in embodiments where water has a greater density than the fluid 64. In this case, the water would generally migrate toward the bottom 72 of the fluid storage vessel 62. Further, positioning these sampling features toward the bottom 72 also allows for water detection even when the fluid storage vessel 62 is nearly empty. As previously noted, the water detection device 10 may only be partially exposed to an interior of the fluid storage vessel 62. For example, the water detection device 10 may extend through a lower-most surface (e.g., the bottom 72) of the fluid storage vessel 62.

Additionally or alternatively, as set forth above, the water detection device 10 may be located in other locations within the fluid storage vessel 62, such as on an internal sidewall 76 of the fluid storage vessel 62. In such embodiments, the water detection device 10 may be coupled to an embodiment of the fluid channel 70, where the fluid channel 70 would still be configured to sample the fluid 64 toward the bottom 72 of the fluid storage vessel 62 (e.g., have an inlet toward the bottom 72). As also shown in FIG. 3, in embodiments where the fluid 64 is not necessarily isolated from the water detection device 10, the chemical drying agent 36 and/or the actuator 34 may also be disposed within the fluid storage vessel 62.

Figure 4:
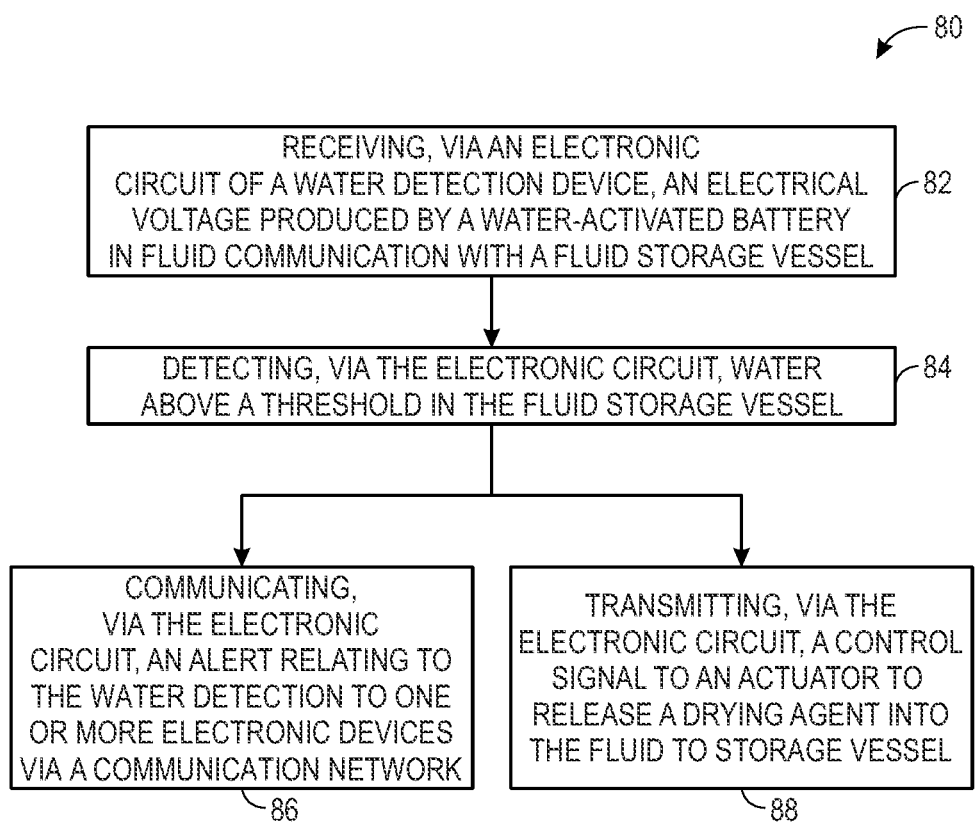
FIG. 4 is a block diagram of an embodiment of a method for utilizing the water detection system of FIG. 1, in accordance with embodiments described herein.

FIG. 4 is a block diagram of a method 80 for utilizing the water detection system 50, in accordance with embodiments described herein. In certain embodiments, the method 80 includes receiving, via the electronic circuit 14 of the water detection device 10, an electrical power (and thus an electrical voltage) produced by the water-activated battery 12 in fluid communication with the fluid storage vessel 62 (block 82).

In addition, in certain embodiments, the method 80 includes detecting, via the electronic circuit 14, water present in an amount above a threshold based on the received electrical voltage (block 84). In some embodiments, the electronic circuit 14 detects the water present in the amount above the threshold by receiving the electrical power from the water-activated battery 12. In addition, in certain embodiments, the method 80 includes (e.g., optionally) communicating, via the electronic circuit 14, an alert relating to the water detection to one or more of the electronic devices 30 via the communication network 24 (block 86). For example, in certain embodiments, the electronic circuit 14 may be configured to communicate with a vehicle control system or control unit so that the vehicle having the fluid storage vessel 62 (e.g., a fuel tank) can alert a driver or other vehicle occupant regarding the water detection. In some embodiments, the vehicle control system or control unit may stop or cease operation of the vehicle until the water is below the threshold (e.g., such that the water-activated battery 12 stops outputting electrical power).

In addition, in certain embodiments, the method 80 may include other actions including, for example, communicating, via the electronic circuit 14, a control signal (e.g., an electrical voltage) to the actuator 34 to release the chemical drying agent 36 into the fluid storage vessel 62 (block 88). As previously noted, this may cause at least some of the water within the stored fluid 64 to be removed. Present embodiments provide for low maintenance techniques for water contamination monitoring. Indeed, a water-activated device may remain unpowered and yet capable of activation for long periods of times. As such, the present embodiments may be more resource-efficient and less computationally intensive than active forms of monitoring (e.g., that require constant power and/or computation). Further, present embodiments may efficiently detect and remedy water contamination scenarios, such as the presence of water in fuel sources (e.g., for vehicles), lubrication fluids (e.g., oil), and so on.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A water detection system for a fluid storage system, comprising:
   a housing configured to be disposed in fluid communication with a fluid storage vessel and to allow water transmission into the housing;
   a water-activated battery disposed within the housing and configured to produce electrical voltage upon contact with water, wherein an actuator coupled to the water-activated battery is configured to physically release a chemical drying agent into the fluid storage vessel in response to the electrical voltage; and
   an electronic circuit configured to detect water above a threshold within the fluid storage vessel based at least in part on the electrical voltage, wherein the electronic circuit is separated from the water-activated battery by a compartment of the housing.

2. The water detection system of claim 1, wherein the electronic circuit is disposed within a sealed chamber of the housing.

3. The water detection system of claim 1, wherein the housing is disposed at a bottom of an interior of the fluid storage vessel.

4. The water detection system of claim 1, wherein the water-activated battery is disposed outside of the fluid storage vessel.

5. The water detection system of claim 4, comprising a fluid channel configured to wick water from the fluid storage vessel, into the housing, and toward the water-activated battery.

6. The water detection system of claim 5, wherein the fluid channel is in fluid communication with an interior of the fluid storage vessel and with a chamber of the housing in which the water-activated battery is disposed.

7. The water detection system of claim 5, wherein the fluid storage vessel comprises an outlet port located at a bottom of the fluid storage vessel, and wherein the fluid channel is fluidly coupled to the outlet port.

8. The water detection system of claim 1, comprising:
   a plurality of fluid storage vessels including the fluid storage vessel; and
   a plurality of water-activated batteries including the water-activated battery, wherein each water-activated battery of the plurality of water-activated batteries is disposed in a respective fluid storage vessel of the plurality of fluid storage vessels.

9. The water detection system of claim 8, wherein each water-activated battery of the plurality of water-activated batteries is associated with a respective vessel identifier that identifies the respective fluid storage vessel.

10. The water detection system of claim 9 comprising a memory device that is configured to store associations between each water-activated battery of the plurality of water-activated batteries with the respective vessel identifier.

11. A fluid storage system comprising:
    a chemical drying agent stored in a chamber;
    a water detection device having a water-activated battery configured to output an electrical power upon contact with water; and
    an actuator coupled to the water detection device and configured to physically release the chemical drying agent from the chamber into the water in response to receiving the electrical power.

12. The fluid storage system of claim 11, wherein the water-activated battery is configured to stop generating electrical power upon not being in contact with the water, and wherein the actuator is configured to block release of the chemical drying agent into the water based on a loss of the electrical power.

13. The fluid storage system of claim 11, wherein the chemical drying agent is silica gel, calcium chloride, calcium sulfate, zeolites, activated charcoal, or any combination thereof.

14. The fluid storage system of claim 11, wherein the water-activated battery comprises a dry material that initiates a chemical reaction when exposed to the water, wherein the chemical reaction generates the electrical power.

15. The fluid storage system of claim 14, wherein the dry material comprises magnesium, aluminum, zinc, lead, thallium, manganese, silicon, iron, calcium, nickel, copper, or a combination thereof.

16. A water detection device comprising:
    a housing;
    a water-activated battery disposed in the housing configured to supply electrical power to an electronic circuit in response to water contacting the water-activated battery, wherein an actuator coupled to the water-activated battery is configured to physically drop a chemical drying agent into a fluid storage vessel in response to the electrical power; and
    a sealed chamber of the housing storing the electronic circuit, wherein the electronic circuit is configured to communicate an alert indicative of water detection to one or more electronic devices via a communication network.

17. The water detection device of claim 16, wherein the water detection device is disposed in a fuel tank of a vehicle, and wherein the electronic circuit is configured to communicate the alert to a vehicle control unit of the vehicle.

18. The water detection device of claim 16, comprising an auxiliary battery configured to periodically provide a second electrical power to the electronic circuit.

19. The water detection device of claim 18, wherein the electronic circuit is configured to use the second electrical power to perform self-diagnosis.

20. The water detection device of claim 18, wherein the electronic circuit is configured to use the second electrical power to communicate with an electronic device.

* * * * *